(12) United States Patent
Monro et al.

(10) Patent No.: US 7,848,607 B2
(45) Date of Patent: Dec. 7, 2010

(54) FABRICATION OF NANOWIRES

(75) Inventors: Tanya Monro, Adelaide (AU); Heike Ebendorff-Heidepriem, Adelaide (AU)

(73) Assignee: Adelaide Research & Innovation Pty Ltd, South Australia (AU)

( * ) Notice: Subject to any disclaimer, the term of this patent is extended or adjusted under 35 U.S.C. 154(b) by 0 days.

(21) Appl. No.: 12/089,986

(22) PCT Filed: Oct. 12, 2006

(86) PCT No.: PCT/AU2006/001501

§ 371 (c)(1),
(2), (4) Date: Jul. 29, 2008

(87) PCT Pub. No.: WO2007/041792

PCT Pub. Date: Apr. 19, 2007

(65) Prior Publication Data

US 2009/0028488 A1  Jan. 29, 2009

(30) Foreign Application Priority Data

Oct. 12, 2005  (AU) .............................. 2005905619
Oct. 12, 2005  (AU) .............................. 2005905620

(51) Int. Cl.
*G02B 6/02* (2006.01)
*G02B 6/036* (2006.01)

(52) U.S. Cl. ...................................... 385/123; 385/126
(58) Field of Classification Search ................. 385/123, 385/126
See application file for complete search history.

(56) References Cited

U.S. PATENT DOCUMENTS

| 4,022,603 | A | 5/1977 | Roeder et al. | |
| 5,907,652 | A | 5/1999 | DiGiovanni et al. | |
| 6,418,258 | B1 | 7/2002 | Wang | |
| 6,723,435 | B1 | 4/2004 | Horne et al. | |
| 7,229,692 | B2* | 6/2007 | Melechko et al. | 428/446 |
| 7,419,601 | B2* | 9/2008 | Cooper et al. | 210/679 |
| 7,553,371 | B2* | 6/2009 | Dubrow et al. | 117/90 |
| 7,579,077 | B2* | 8/2009 | Dubrow et al. | 428/357 |
| 2002/0126936 | A1 | 9/2002 | Lockhart | |

(Continued)

FOREIGN PATENT DOCUMENTS

EP  0 905 834  3/2001

(Continued)

OTHER PUBLICATIONS

Lou et al., "Modeling of Silica Nanowires for Optical Sensing," Optics Express, vol. 13, No. 6, pp. 2135-2140, 2005.

(Continued)

*Primary Examiner*—K. Cyrus Kianni
(74) *Attorney, Agent, or Firm*—Greenblum & Bernstein, PLC

(57) ABSTRACT

A method of forming a nanowire is disclosed. In one embodiment, a primary preform is formed comprising at least one central region and a support structure. The primary preform is then drawn to a cane, which is then inserted into an outer portion, to form a secondary preform. The secondary preform is then drawn until the at least one central portion is a nanowire. The method can produce nanowires of far greater length than existing methods, and can reduce the likelihood of damaging the nanowire when handling.

10 Claims, 6 Drawing Sheets

U.S. PATENT DOCUMENTS

| | | | |
|---|---|---|---|
| 2002/0159943 A1* | 10/2002 | Smalley et al. | 423/447.1 |
| 2003/0026980 A1* | 2/2003 | Takeda et al. | 428/364 |
| 2003/0059185 A1 | 3/2003 | Russell et al. | |
| 2003/0103708 A1 | 6/2003 | Galstian et al. | |
| 2005/0053345 A1 | 3/2005 | Bayindir et al. | |
| 2005/0147366 A1 | 7/2005 | Large et al. | |
| 2005/0176245 A1* | 8/2005 | Melechko et al. | 438/672 |
| 2005/0181195 A1* | 8/2005 | Dubrow | 428/297.4 |
| 2005/0188727 A1 | 9/2005 | Greywall | |
| 2005/0199415 A1 | 9/2005 | Glew | |
| 2005/0260120 A1* | 11/2005 | Smalley et al. | 423/447.1 |
| 2005/0263456 A1* | 12/2005 | Cooper et al. | 210/660 |
| 2006/0002844 A1* | 1/2006 | Suenaga et al. | 423/447.3 |
| 2006/0038990 A1* | 2/2006 | Habib et al. | 356/301 |
| 2006/0104582 A1 | 5/2006 | Frampton et al. | |
| 2006/0159916 A1* | 7/2006 | Dubrow et al. | 428/357 |
| 2006/0176911 A1* | 8/2006 | Salin et al. | 372/6 |
| 2006/0204738 A1* | 9/2006 | Dubrow et al. | 428/292.1 |
| 2006/0228140 A1* | 10/2006 | Swift et al. | 399/411 |
| 2007/0140638 A1* | 6/2007 | Yang et al. | 385/132 |
| 2007/0190880 A1* | 8/2007 | Dubrow et al. | 442/181 |
| 2007/0273055 A1* | 11/2007 | Sazio et al. | 264/1.24 |
| 2007/0282247 A1* | 12/2007 | Desai et al. | 604/19 |
| 2008/0138571 A1* | 6/2008 | Sazio et al. | 428/131 |
| 2009/0143227 A1* | 6/2009 | Dubrow et al. | 502/406 |
| 2009/0147253 A1* | 6/2009 | Hartmann et al. | 356/246 |
| 2009/0263912 A1* | 10/2009 | Yang et al. | 436/164 |

FOREIGN PATENT DOCUMENTS

| | | | |
|---|---|---|---|
| EP | 1 568 664 | | 8/2005 |
| GB | 2 386 434 | | 9/2003 |
| GB | 2386434 A | * | 9/2009 |
| WO | 03/009026 | | 1/2003 |

OTHER PUBLICATIONS

Leong et al., "A Lead Silicate Holey Fiber with $\gamma=1860\ W^{-1}km^{-1}$ at 1550 nm," Proceedings of OFC, Mar. 2005.

Ebendorff-Heidepriem et al., "Bismuth Glass Holey Fibers with High Nonlinearity," Optics Express, vol. 12, No. 21, pp. 5082-5087, 2004.

Lizé et al., "Microstructured Optical Fiber Photonic Wires with Subwavelength Core Diameter," Optics Express, vol. 12, No. 14, p. 3209-3217, 2004.

Tong et al., "Single-Mode Guiding Properties of Subwavelength-Diameter Silica and Silicon Wire Waveguides," Optic Express, vol. 12, No. 6, p. 1025-1035, 2004.

Rowland et al., "Nonlinearity Enhancement of Filled Microstructured Fibers Operating in the Nanowire Regime," Optical Fiber Communication Conference (OFC2006), Anaheim, Mar. 5-10, 2006, Paper OTuH3, 2006.

* cited by examiner

FABRICATION OF NANOWIRES

FIELD OF THE INVENTION

The present invention relates to the fabrication of wires having a diameter of the order of nanometers.

PRIORITY

This application claim priority from the following Australian Provisional Patent Applications:

2005905619 entitled "Fabrication of Nanowires" filed on 12 Oct. 2005; and 2005905620 entitled "Method and Device for Forming Microstructured Fibre" filed on 12 Oct. 2005.

The entire content of each of these applications is hereby incorporated by reference.

INCORPORATION BY REFERENCE

"Nonlinearity enhancement of filled microstructured fibres operating in the nanowire regime", K. J. Rowland, Shahraam Afshar V, T. M. Monroe; Optical Fiber Communication Conference (OFC'2006), Anaheim 5-10 Mar. 2006, Paper OThH4, 2006.

The entire content of this publication is hereby incorporated by reference.

BACKGROUND

Nanowires are wires having diameters ranging up to several hundred nanometers. Nanowires are extremely sensitive to their surroundings and so are suited to a plethora of sensing applications. The fibre geometry provides extremely long optical path lengths and allows the use of small sample volumes.

Nanowires work by detecting changes in light, whereby the nanowire functions as a "rail" for the light since most of the light is situated in the surrounding cladding comprising holes filled with air or fluid, and thus the light can interact with any materials (gases, liquids, particles, etc) in the holes. Changes in the properties of the mode field of the light due to interaction with the material will be transmitted along the nanowire and can be detected at the output end of the nanowire device.

A nanowire has enhanced sensitivity compared with wires of larger diameter, since the power fraction of light in the environment is much larger for nanowires than for wires of larger diameter. The larger power fraction of light in the fluid surrounding the nanowires results in larger overlap of light and fluid, resulting in the enhanced sensitivity of nanowires.

Nanowires are however, difficult to fabricate. The fabrication of nanowires in the laboratory is a process which requires considerable skill, particularly since it is desirable to produce a wire in which the diameter does not fluctuate substantially over the length of the wire and the sidewall roughness is kept to a minimum. Diameter fluctuations, sidewall roughness and contamination can make the wires unsuitable for low loss optical wave guiding.

In order to have broad ranging commercial application, it is desirable that nanowires are of a sufficient length for practical use. For, example, the wires may be required as sensors, embedded into a structure having dimensions of the order of meters. However, known techniques for the fabrication of nanowires result in very short portions of wire, which are of scientific interest but have limited commercial viability.

One known technique for the formation of nanowires includes a two step drawing process. The first step involves the use of a flame to draw a silica fibre to micrometer-diameter wire. Secondly, one end of the drawn wire is placed horizontally onto a tapered tip (usually a sapphire fibre taper) and the tip is rotated about its axis to wind the silica nanowires. Using this technique, nanowires with diameters smaller than 50 nm can be obtained, however, the lengths of wires produced are only of the order of tens of millimetres. A problem anticipated for longer nanowires is that while they are extremely sensitive to their surroundings, they are fragile and prone to contamination during handling. One way of supporting a nanowire is to encase the wire in a porous substance such as an aerogel. This allows the wire to be handled, however, the disadvantage is that the arrangement is no longer flexible, which limits the commercial application as well as the ability to act as a sensor.

Nevertheless, a nanowire which is fully enclosed within a supporting structure loses the ability to perform point detection since the core may not be close enough to the surface walls.

It is an object of the present invention to address at least one of the problems discussed above.

SUMMARY OF THE INVENTION

According to one aspect of the present invention, there is provided a method of forming a fibre incorporating a nanowire, the method comprising:
  forming a primary preform comprising a central portion and a support structure for supporting the central portion;
  drawing the primary preform to form a cane;
  forming an outer portion having a cane receiving portion for receiving the cane;
  inserting the cane into the cane receiving portion to form a secondary preform; and
  drawing the secondary preform until the central portion is a nanowire.

In one form, the primary preform is formed by extrusion.

In one aspect, the outer portion is formed to provide a space leading to the cane receiving portion.

In one form, the space is a wedge-shaped cut-away in the outer portion.

In another form, the method further comprises etching away at least a part of the support structure that is exposed to the space to expose the nanowire.

In one form, the primary preform is made from a soft glass.

In one aspect of this, the soft glass is lead silicate.

In another form, the primary preform is made from a polymer.

According to another aspect of the present invention, there is provided a fibre containing a nanowire, the fibre comprising:
  an outer portion defining the outer surface of the fibre;
  a nanowire within the outer portion; and
  a support structure between the outer portion and the nanowire supporting the nanowire.

In one form, the fibre further comprises at least one cladding region surrounding the nanowire.

In one form, the support structure comprises at least one strut extending radially from the central portion.

In one aspect, the at least one strut terminates at a wall portion forming a perimeter of the support structure.

In another aspect, the support structure comprises four struts extending radially from the central portion.

In one form, the wall portion defines a square in cross-section.

In one aspect, the outer portion comprises a cut-out for providing access to a part of the wall portion.

In another aspect, the wall portion defines three sides of a square in cross-section.

In one form, the cut-out is wedge-shaped.

According to another aspect of the present invention, there is provided a method of forming a nanowire, the method comprising:

forming a preform structure comprising a central portion supported by a support structure, and an outer portion surrounding the central portion and the support structure; and drawing the preform structure until the central portion is a nanowire.

In one form, the step of forming the preform structure comprises inserting the central portion and the support structure into the outer portion.

In another form, the step of forming the preform structure comprises extruding the preform structure.

In one aspect, the method further comprises forming the central portion and the support structure by drawing a primary preform structure.

In another aspect, the method further comprises forming the primary preform structure by extrusion.

According to another aspect of the present invention, there is provided a nanowire formed according to the method of any one of the preceding methods.

According to another aspect of the present invention, there is provided a preform for forming a fibre containing a nanowire, the preform comprising:

a central portion supported by a support structure; and an outer portion surrounding the central portion and the support structure.

In one form, the support structure comprises at least one strut extending radially from the central portion.

In one form, the at least one strut terminates at a wall portion forming a perimeter of the support structure.

In another form, the support structure comprises four struts extending radially from the central portion.

In one form, the wall portion defines a square in cross-section.

In one form, the outer portion comprises a cut-out for providing access to a part of the wall portion.

In one form, the cut-out is wedge-shaped.

In another form, the four struts terminate in respective corners of the wall portion.

According to another aspect of the present invention, there is provided a method of forming a nanowire, the method comprising drawing a cane having a central portion supported by a support structure until the central portion is a nanowire.

According to another aspect of the present invention, there is provided a method of increasing the nonlinearity of a nanowire, the method comprising surrounding the nanowire with a nonlinear fluid.

In one form, the nanowire is surrounded by a support structure and an outer portion, defining at least one channel in fluid communication with the nanowire, the step of surrounding the nanowire with the nonlinear fluid comprising introducing the nonlinear fluid into the at least one channel.

In one form, the nonlinear fluid is carbon disulphide.

According to a further aspect of the present invention, there is provided a fibre incorporating a nanowire, formed by the method according to any one of the preceding methods.

According to a further aspect of the present invention, there is provided a sensor comprising the fibre according to any one of the preceding aspects of the invention for sensing at least one parameter of an environment existing within the at least one cladding region.

According to a further aspect of the present invention, there is provided a method of forming a fibre incorporating a plurality of nanowires, the method comprising:

forming a primary preform comprising at plurality of central portions and a support structure for supporting the plurality of central portions;

drawing the primary preform to form a cane;

forming an outer portion having a cane receiving portion for receiving the cane;

inserting the cane into the cane receiving portion to form a secondary preform; and drawing the secondary preform until the plurality of central portions are nanowires.

In one form, the primary preform is formed by extrusion.

In one form, the outer portion is formed to provide a space leading to the cane receiving portion.

In one form, the space is a wedge-shaped cut-away in the outer portion.

In one form, the method further comprises etching away at least a part of the support structure that is exposed to the space to expose at least one of the nanowires.

In one form, the primary preform is made from a soft glass.

In one aspect, the soft glass is lead silicate.

In another form, the primary preform is made from a polymer.

According to another aspect of the present invention, there is provided a fibre containing a plurality of nanowires, the fibre made by the method of the previous aspect of the present invention.

In one form, the number of nanowires is 2.

In another form, the number of nanowires is 3.

According to a further aspect of the present invention, there is provided a nanowire greater than 10 mm in length.

In one form, the nanowire is about 1 km in length.

In another form, the nanowire is about 10 km in length.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgement or any form of suggestion that such prior art forms part of the common general knowledge.

A specific embodiment of the invention will now be described in some further detail with reference to and as illustrated in the accompanying figures. This embodiment is illustrative, and is not meant to be restrictive of the scope of the invention. Suggestions and descriptions of other embodiments may be included within the scope of the invention but they may not be illustrated in the accompanying figures or alternatively features of the invention may be shown in the figures but not described in the specification.

BRIEF DESCRIPTION OF THE FIGURES

An embodiment of the invention is illustrated in the accompanying representation in which.

DETAILED DESCRIPTION

Figure 1A:
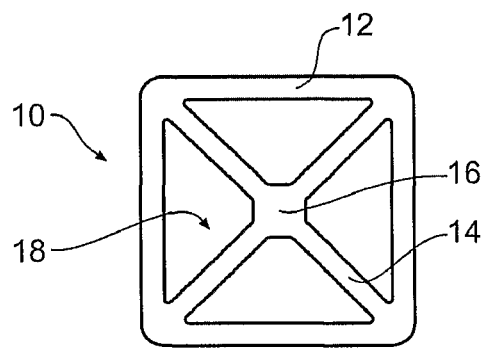
FIG. 1A—is a cross-sectional view of a primary preform for use in the present invention.

In accordance with one aspect of the present invention, a primary preform is first formed with the required structures therein. FIG. 1A is a cross-sectional view of a primary preform 10 which comprises a support structure having walls 12 and struts 14 surrounding a central portion 16. It will be appreciated that the term "central portion" is not meant to indicate the geometrical or mathematical centre, but rather refers to the region or elements supported by the support structure, and may be offset from the centre and in fact may be one of several other 'central portions'. The support structure and central portion may also define cladding or air channels 18 running along the longitudinal axis of the primary preform 10. The purpose of these will be described in more detail below. It will be appreciated that it is not essential that cladding regions be provided.

In one form, primary preform 10 is formed by extruding a billet of suitable material through a suitably designed die. Suitable materials for forming the primary preform include polymers and soft glasses such as fluoride, heavy metal oxides, chalcogenides and other glass types. In one particular embodiment, the material is soft glass such as lead silicate which is passed through the die at a temperature of 520° C. and a fixed ram speed of 0.2 mm/min.

In other forms of the invention, primary preform 10 may be formed by other methods including moulding, casting, drilling stacking or even manual assembly.

The width of primary preform in FIG. 1A is approximately 25 mm however the width may be of any suitable dimension including varying from around 5 mm-50 mm (not exhaustive) or more, and may be 10 mm-20 mm, 15 mm-25 mm, 20 mm-30 mm, 25 mm-40 mm, 30 mm-50 mm or more and, when being formed by extrusion, will depend upon the dimensions of the die through which the preform is extruded.

Similarly, the diameter of the central portion 16 can vary as desired, and in one example is about 2 mm.

A suitable die and extrusion method are detailed in a co-pending application entitled: "Method and device for forming micro-structured fibre", claiming priority from Australian provisional patent application no. 2005905620 filed on 12 Oct. 2005, the entire contents of which are hereby incorporated by reference.

Figure 1B:
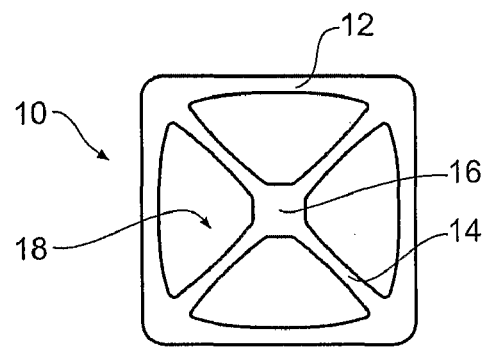
FIG. 1B—is a cross-sectional view of an alternative form of the primary preform of FIG. 1A.

It will be appreciated that any number of struts as is practicable could be disposed within primary preform 10. For example, three struts could be used instead of four. In fact, the number of struts could be 1, 2, 3, 4, 5, 6, 7, 8, 9, 10 or more. Furthermore, the primary preform need not have a square shaped cross-section but instead could be any desired shape. For example, the cross-section may be circular, triangular, rectangular, pentagonal, hexagonal, heptagonal, octagonal etc, or be of an irregular shape. It is also an option that the struts are shaped differently to those illustrated in FIG. 1A, for example the struts may be curved, thereby defining cladding or air channels with a substantially semi-circular cross-section. FIG. 1B shows an example of such a structure. Any other shape could be used as well, including wedge-shaped or having irregular sides. Any combination of these could also be used; indeed each individual strut need not be of the same shape.

Figure 1C:
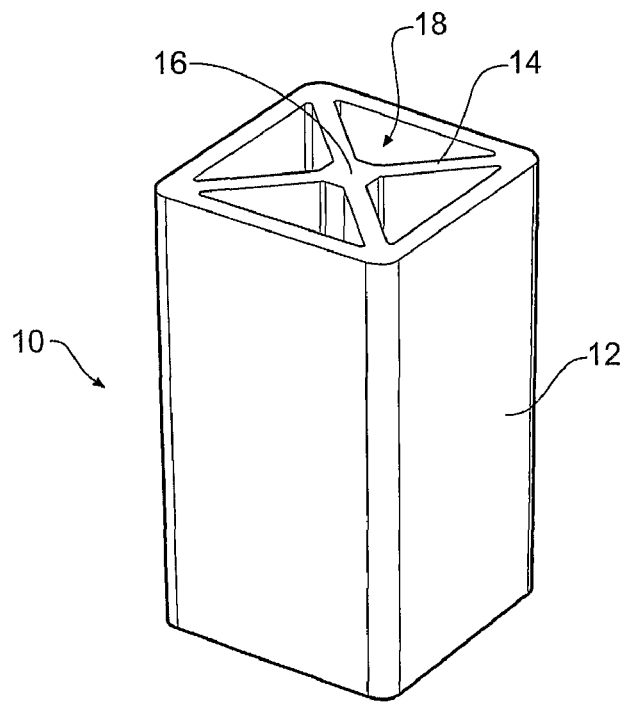
FIG. 1C—is a perspective view of the primary preform of FIG. 1A.

FIG. 1C is a perspective view of the primary preform 10 showing the three-dimensional structure of the preform depicted in FIG. 1A.

Figure 2:
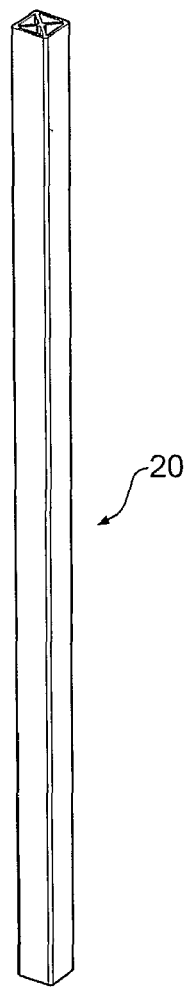
FIG. 2—is a perspective view of a cane resulting from the primary preform of FIG. 1A.

Once formed, primary preform 10 is then reduced in scale in a drawing tower, to form a cane 20 as shown in FIG. 2. The action of drawing and the use of drawing towers are well known in the art for forming fibres and the details relating to this need not be described herein. In this particular example, the feed rate for moving the preform into the hot zone of the drawing tower furnace is in the order of several mm/min, and for example 0.5-3/min whereas the draw speed, which relates to how fast the material is moved out of the hot zone, is in the order of hundreds or thousands of mm/min, for example 10-20 m/min. For the example values of dimensions of the preform given above, this provides a cane width of approximately 1 mm, with a core diameter of about 77 microns. FIG. 2 shows a portion of a length of cane 20 (not drawn to scale). It will be understood, that the cane has substantially the same topology as the primary preform (although there may be variations in shape and dimension attributed to scaling down of the structure during the caning process).

Figure 3A:
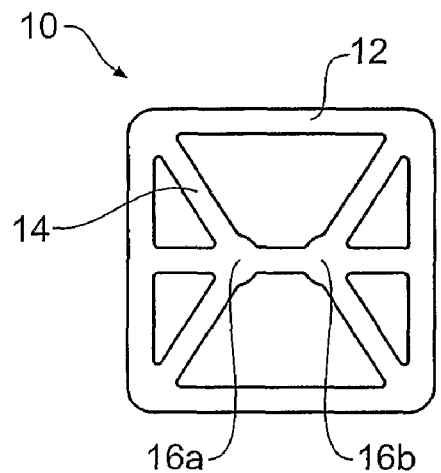
FIG. 3A—is a cross-sectional view of an alternative structure of the primary preform of FIG. 1A showing two central portions.
Figure 3B:
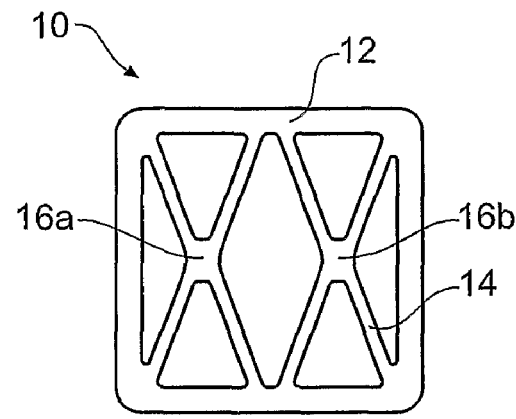
FIG. 3B—is a cross-sectional view of an alternative structure of the primary preform of FIG. 3B.

As previously described, it is also an option that the primary preform 10 has two (or more) central portions 16a and 16b (for example, with each central portion offset from the geometrical centre of the primary preform 10 but forming the centre of an independent strut structure). FIGS. 3A to 3D show cross-sections of primary preforms having a plurality of central portions. In FIG. 3A, the struts 14 are arranged such that the two central portions 16a and 16b are joined. In FIG. 3B, the struts are arranged so that the two central portions 16a and 16b are not joined to one another. It is also possible that a suitable die or other technique could produce a primary preform having three, four, five, six, seven, eight, nine, ten or more central portions arranged in a suitable geometry.

Figure 3C:
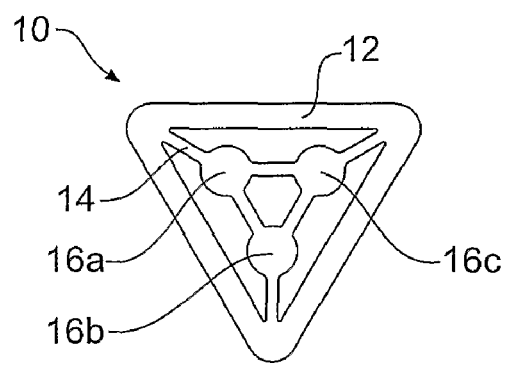
FIG. 3C—is a cross-sectional view of an alternative structure of the primary preform, having three central portions.
Figure 3D:
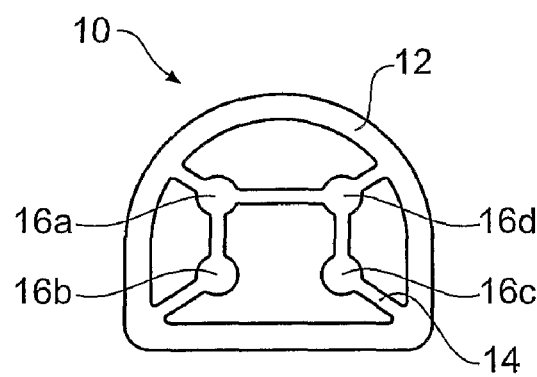
FIG. 3D—is a cross-sectional view of an alternative structure of the primary preform, having four central portions.

FIG. 3C shows a primary preform 10 cross-section having three central portions 16a, 16b and 16c. Not that in this example, primary preform 10 has a triangular periphery, but could be any other suitable shape. In FIG. 3D, primary preform 10 has four central portions 16a, 16b, 16c and 16d. This preform has a semi-circular periphery.

An advantage of having more than one central portion is that multiple central portions allow the formation of multiple nanowires (described in more detail further below). Each nanowire can then be used either as an independent sensor or as coupled sensors and if desired, each nanowire sensor could have different spectral characteristics. Alternatively, one nanowire could serve as a rail for light in one direction and the other nanowire could serve as a return rail for the light.

Figure 4A:
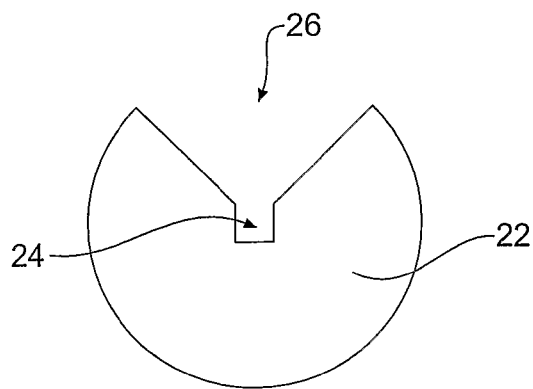
FIG. 4A—is a cross-sectional view of the outer portion or cane jacket for use in the present invention.

FIG. 4A is a cross-sectional view of a cane jacket or outer portion 22 which may also be formed by extrusion through a suitably designed die using similar temperature and speed as for the primary preform extrusion. Of course, any other method may be used e.g. casting, drilling or moulding. The jacket may be formed from the same materials as described above for the primary preform or different materials if appropriate.

Figure 4B:
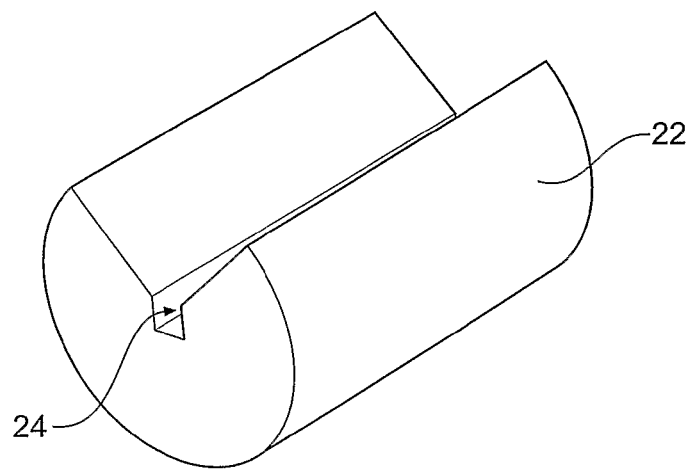
FIG. 4B—is a perspective view of the outer portion or cane jacket of FIG. 2A.

Cane jacket 22 has a cane receiving portion 24 which forms a longitudinal channel running along the longitudinal axis of the cane jacket. This longitudinal channel is more clearly shown in FIG. 4B which is a perspective view of the cane jacket 22 of FIG. 4A.

Figure 5:
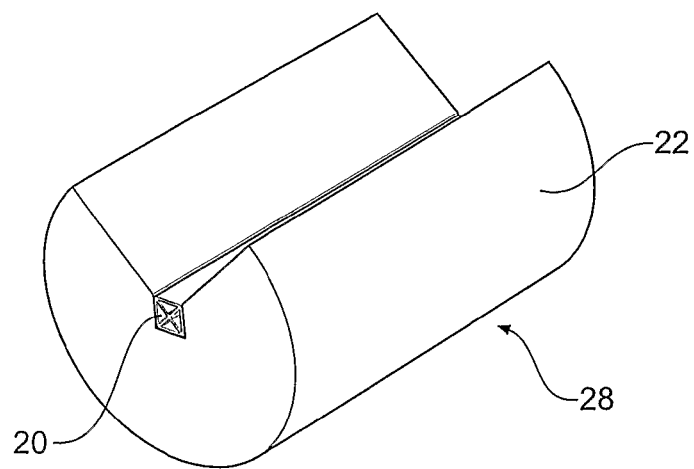
FIG. 5—is a perspective view of the secondary preform for use in the present invention.

Cane receiving portion 24 is disposed within a space, which in one embodiment, is a wedge shaped cut-away 26. The wedge shaped cut-away allows cane 20 to be manually inserted in the jacket, thereby forming a preform assembly, or secondary preform 28 as shown in FIG. 5. FIG. 5 is a perspective view of preform assembly 28 showing cane 20 disposed within cane jacket 22. Alternatively, cane 20 may be slid into cane receiving portion from one end.

It is an option that a structure similar to preform assembly 28 is prepared as one integral preform, rather than being formed from two separately prepared parts which are subsequently joined as has been described above. However, given that the dimensions of cane 20 are relatively small (i.e. width of cane is 1 mm) it is preferable to draw the cane from a macroscopic primary preform since this ensures that the dimensions remain consistent along the length of the cane. Nevertheless, complicated structures providing an integral cane and cane jacket may be obtained through extrusion for example, using a die such as that described in the previously incorporated reference entitled "Method and Device for Forming Microstructured Fibre"

As outlined above, it is also an option that primary preform 10 has a cross-section other than a square cross-section. In this case, cane receiving portion 24 of jacket 22 would be of a corresponding shape so as to snugly fit cane 20 into the receiving portion. For example, if cane 20 had a circular cross-section, cane receiving portion of jacket 22 could be shaped as a semicircle. If cane 20 had a triangular, cane receiving portion could also be shaped as a triangle.

In one embodiment, the cane jacket has an outer diameter of about 23 mm and the cane receiving portion having an inner edge-to-edge length of about 1.3 mm. Again, any other suitable dimensions would be possible as would be understood by the person skilled in the art.

Figure 6:
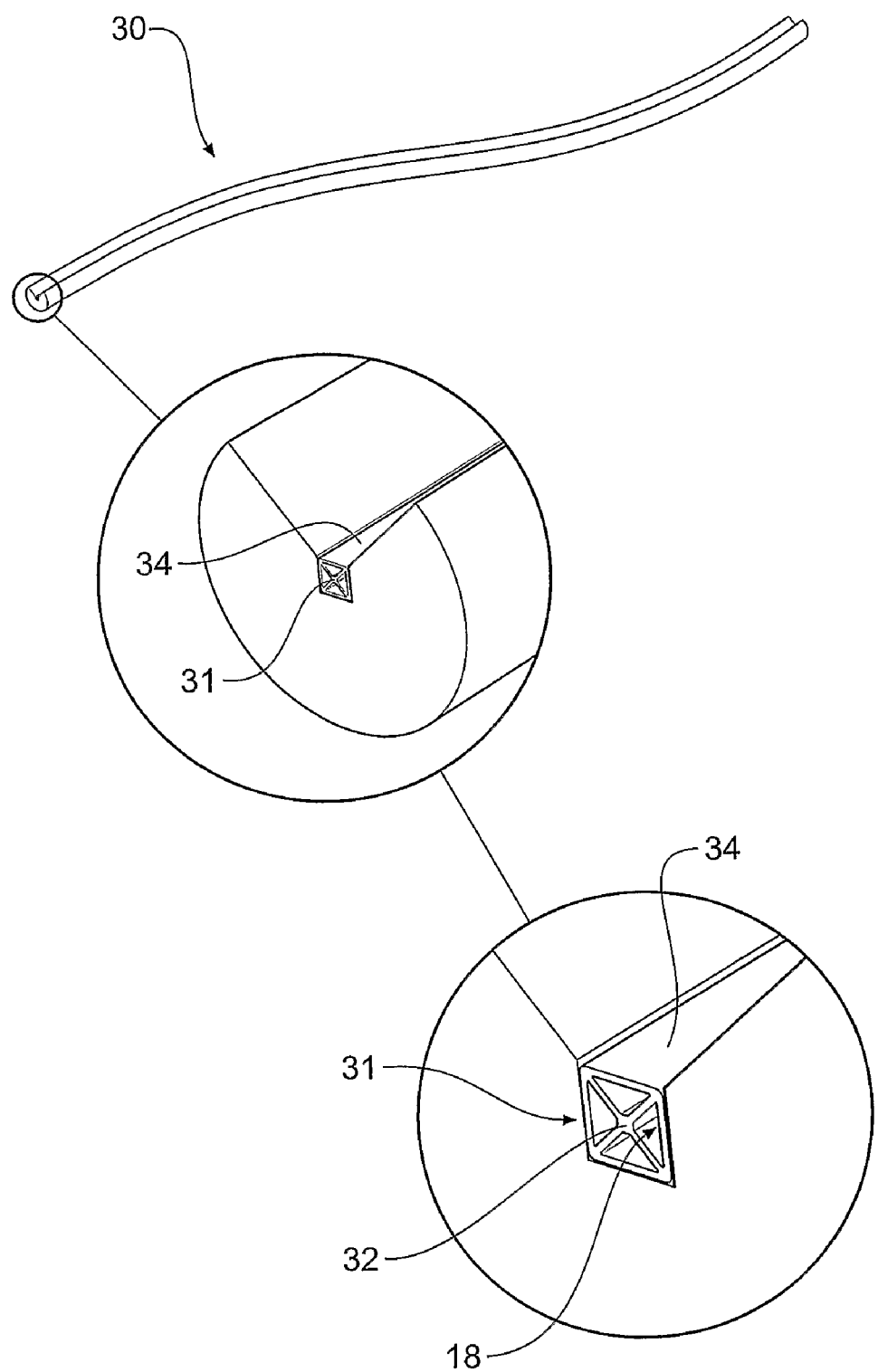
FIG. 6—shows the completed fibre containing the nanowire according to an aspect of the present invention, showing various magnifications.

Once assembled, preform assembly or secondary preform 28 is drawn, in a drawing tower, in order to create a fibre 30 having a core 31 (FIG. 6). The combination of preform feed of several mm/min and for example, 0.5-3 mm/min and draw speed of tens of m/min and for example 10-20 m/min enables down-scaling of the preform assembly to fibres having outer width of 100-200 microns and core size of hundreds of nanometers. For the example dimensions given above in relation to the preform assembly, this will result in a drawn fibre having an outer diameter of about 150 microns, and a core diameter of about 0.5 microns. The length of the fibre and nanowire produced in this example is about 1 km.

Nanowires produced according to the various aspects of the present invention are able to achieve lengths far greater than those currently achievable. The length of the nanowire produced in unitary form may range from tens of millimetres to hundreds of kilometers in length. For example, the nanowire may be 5 mm-10 mm, 1 cm-5 cm, 5 cm-10 cm, 10 cm-20 cm, 20 cm-50 cm, 15 cm-75 cm, 50 cm-100 cm, 100 cm-250 cm, 200 cm-500 cm, 500 cm-1000 cm, 1 km-1.5 km, 2 km-5 km, 5 km-10 km, 10 km-50 km, 50 km-100 km, 100 km-200 km.

It should be understood that fibre 30 has substantially the same topology as preform assembly 28 however the cross-section dimensions are substantially reduced. Most importantly, the central portion 16 of primary preform 10 now has a width of the order of nanometers, thereby providing nanowire 32.

Nanowire 32 is supported by support structure or walls 12 which defines around the wire, cladding or air channels 18. In use, a substantial portion of guided light will be situated in the air channels 18 surrounding nanowire 32, the nanowire acting as a rail rather than a pipe for the light. The support structure 12 is further supported by jacket 22 which allows the nanowire 32 to be handled as a traditional fibre. The structural integrity provided to the nanowire by the outer jacket means that the problems of fragility and contamination which have posed difficulties for fabricated nanowires in the past are eliminated to a certain extent.

In FIG. 6, the portion of support structure or wall 12 which is exposed to the surrounding air can be clearly seen and is marked as wall 34. Wall 34 can be etched away using organic solvents (e.g. acetone) in the case of polymers, or inorganic acids (e.g. nitric, sulphuric or hydrofluoric acid) in the case of soft glasses, to expose one portion of the nanowire 32 to the surrounding atmosphere. Etching a continuous length of fibre will provide environmental sensitivity along the fibre length (apart from the ends, one of which will ultimately be connectorised to a light source and the other end will be ultimately connectorised to a detector). Alternatively, portions of wall 34 can be selectively etched as desired in order to allow localised access to the core 31 of fibre 30.

It is an option that the wedge shaped cutaway 26 has any shape which permits some access to the core 31 of fibre 30. For example, the cut-away portion of jacket 22 could be a groove, having sides which are substantially parallel to one another.

The exposed core fibre addresses the problem of having a supported nanowire which must compromise its sensitivity for the support. Instead, in this arrangement, the nanowire is both supported and sensitive since the core is as close to the surface as possible.

Figure 7A:
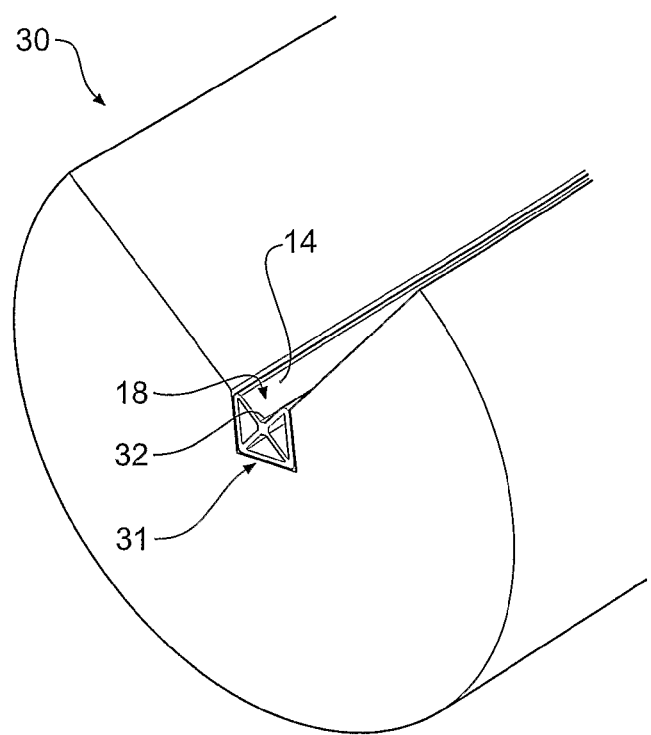
FIG. 7A—shows the completed fibre of FIG. 6 with a wall portion etched away.

It should be appreciated that struts 14 may be disposed so that once a portion of support structure 12 is etched away, the entire core 31 of fibre 30 is not exposed e.g. one air channel 18 (see FIG. 1A) is exposed to the surrounding air. The remaining air channels remain sealed which reduces the contamination of the core. FIG. 7A shows this arrangement, in which wall 34 has been etched away or otherwise removed, leaving channel 18 and therefore nanowire 32, partially exposed to the environment. This leaves three other channels 18 sealed from the environment.

Figure 7B:
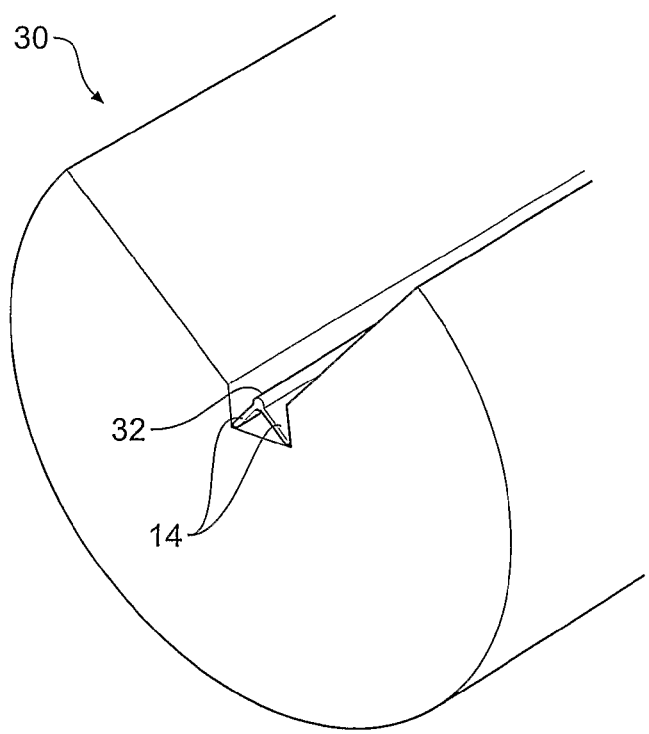
FIG. 7B—shows the completed fibre of FIG. 7A with two struts also etched away.

It will of course also be understood that it is possible to perform the etching in such a way, that not only wall 34 but also the two struts at the end of wall 34 are totally or partly etched and thus the fluid to be sensed has access to three air channels. In this case, the core may only be supported by two struts, as shown in FIG. 7B. In this arrangement, one channel 18 remains isolated from the environment.

It is also an option that cane 20 is prepared with one or more walls missing such that upon incorporation into jacket 22 the nanowire is exposed without the need for etching. The etching of a wall once the fibre is formed however, (as has been described above) reduces the exposure of the nanowire to the surrounding environment prior to use of the fibre thereby reducing contamination.

While not essential, it could be useful to have one or more "sealed" channels to allow the introduction and isolation of different fluids. This can be used to allow differential sensing between two different environments, or indeed use one of the channels to house a reference fluid to provide for internal referencing.

In application, the materials (gases, liquids, particles, etc) introduced into the channels may be used to increase the non-linearity of the sensor formed by the structure according to the various aspects of the present invention. In particular, the introduction of a non-linear fluid such as Carbon Disulphide ($CS_2$) into the channels has been found to significantly enhance the effective nonlinear coefficient of soft glass nanowires and microstructured fibres with nanowire cores such as provided by the present invention.

This application is set out in more detail in the paper entitled "Nonlinearity of filled microstructured fibres operating in the nanowire regime" K. J. Rowland, Shahraam Afshar V, T. M. Monroe; Optical Fiber Communication Conference (OFC'2006), Anaheim 5-10 Mar. 2006, Paper OThH4, 2006 the entire contents of which are hereby incorporated by reference.

In other applications, useful information could be obtained by exciting one or more materials within the channels to cause them to emit energy (or fluoresce) into the nanowire itself, which can then be detected at an end of the nanowire/fibre structure and analysed.

It is also within the scope of the present invention to produce a nanowire by simply drawing the cane structure shown in FIG. 2, until the central portion is of desired dimensions to act as a nanowire. Indeed, it is within the scope of an aspect of the present invention to form the nanowire by drawing the preform directly.

It is also within the scope of the present invention to form a completely exposed nanowire. This may be done in a number of ways including forming the enclosed nanowire according to the various aspects of the present invention, and etching or otherwise dissolving the outer portion or jacket and support structure to leave the internal nanowire exposed. In this case, the central portion can be constituted by a different material to the support structure and outer portion to facilitate the selective removing of the material around the nanowire. Alternatively, the support structure could be etched away completely to allow the outer portion and the nanowire to be separated.

Of course, if the nanowire is formed from simply drawing the cane, without the use of the outer portion (or cane jacket), as described above, it will be necessary only to dissolve the support structure to leave the completely exposed nanowire.

Figure 8:
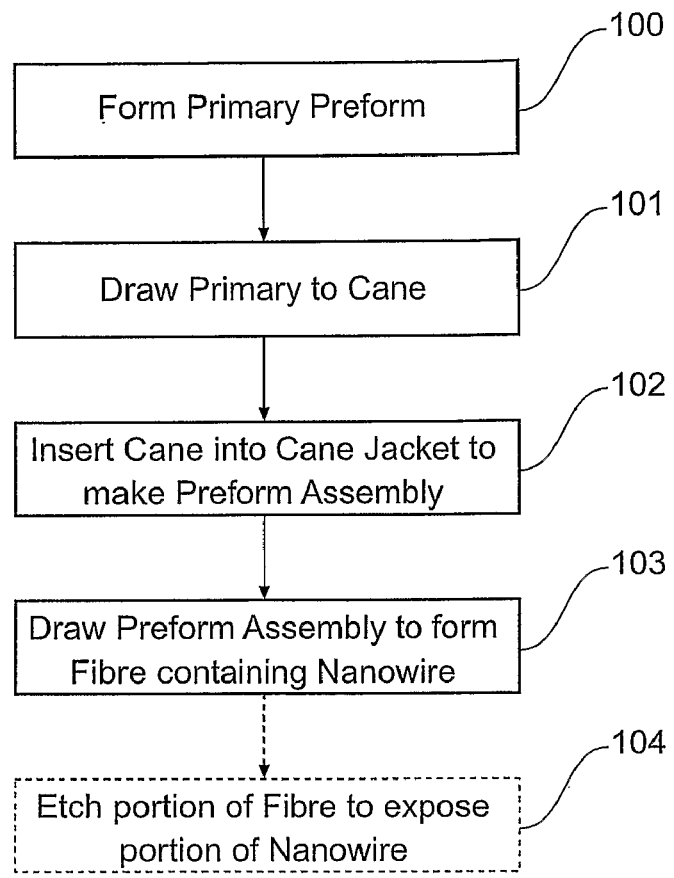
FIG. 8—shows a flowchart of one method of forming a nanowire according to an aspect of the present invention.

FIG. 8 is a flowchart showing various steps according to one method described above. In step 100, the primary preform as shown in FIGS. 1A and 1C is formed by any suitable means such as extrusion. In step 102, this primary preform is drawn to form a cane as shown in FIG. 2. In step 102, the cane is inserted into a cane jacket as shown in FIG. 5, to form a preform assembly. In step 103, the preform assembly is then drawn until it has achieved the desired dimensions, and in particular, until the central portion(s) has achieved dimensions of a nanowire as described above, and shown in FIG. 6.

The resulting article is a fibre containing within it, a nanowire. An optional step is then shown as step 104 (dotted lines), in witch at least a portion of the fibre is etched away, or otherwise removed, to expose a portion of the nanowire for use in applications such as sensing. Of course it will be understood that in some applications such as optical communications for example, it may be desirable to leave the nanowire completely encased in the fibre, and therefore no etching or removal will be done. It may also be an option to completely remove the fibre to leave the nanowire entirely exposed for other applications as required.

Figure 9:
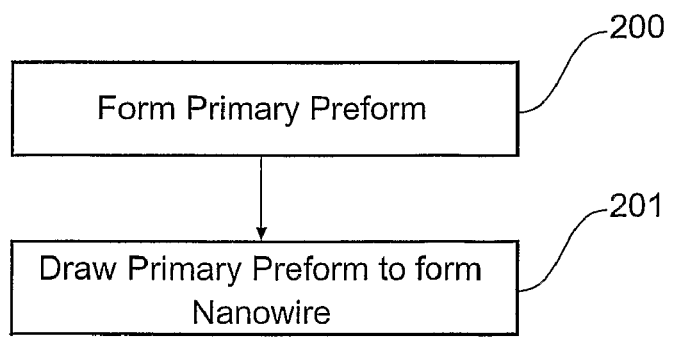
FIG. 9—shows a flowchart of another method of forming a nanowire according to another aspect of the present invention.

FIG. 9 shows an alternative method of forming a fibre containing a nanowire. In this method, in step 200, the primary preform as shown in FIG. 1 is formed by any suitable means, and in step 201, this primary preform is drawn, and is continued to be drawn, until the desired dimensions are achieved, such as until the central portion(s) attains the dimensions of a nanowire.

It will also be understood that a particular party could perform one or more aspects of the invention at different stages. For example, one party could form the primary preform, another party could obtain the preformed primary preform from this party and draw it to a cane or directly to a fibre containing the nanowire, another party could obtain the cane and draw this to a fibre containing a nanowire, and a further party could then etch the fibre containing the nanowire as desired, depending upon the intended application.

It is intended that the present application cover all combinations of these methods.

The nanowires and fibres produced according to the various aspects of the invention have many applications, including, but not limited to sensors for use in scientific, medical, military/defence and commercial application; displays for electronic products such as computers, Personal Digital Assistants (PDAs), mobile telephones; image displays and sensors for cameras and camera phones; optical data storage; optical communications; optical data processing; traffic lights; engraving; and laser applications.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention.

Therefore, the invention should be understood to include all such modifications within its scope.

The invention claimed is:

1. A fibre containing a nanowire, the fibre comprising:
    an outer portion defining the outer surface of the fibre;
    a nanowire within a cane receiving portion of the outer portion; and
    a support structure between the cane receiving portion of the outer portion and the nanowire supporting the nanowire.

2. A fibre as claimed in claim 1 further comprising at least one cladding region surrounding the nanowire.

3. A sensor comprising the fibre according to claim 2 for sensing an environment existing within the at least one cladding region.

4. A fibre as claimed in claim 1 wherein the support structure comprises at least one strut extending radially from the central portion.

5. A fibre as claimed in claim 4 wherein the at least one strut terminates at a wall portion forming a perimeter of the support structure.

6. A fibre as claimed in claim 5 wherein the outer portion comprises a cut-out for providing access to a part of the wall portion.

7. A fibre as claimed in claim 6 wherein the cut-out is wedge-shaped.

8. A fibre as claimed in claim 4 wherein the support structure comprises four struts extending radially from the central portion.

9. A fibre as claimed in claim 8 wherein the wall portion defines a square in cross-section.

10. A fibre as claimed in claim 8 wherein the wall portion defines three sides of a square in cross-section.

* * * * *